July 25, 1967   O. G. GARNER   3,332,138
METHOD AND APPARATUS FOR MAKING PRECISION SIZED TUBING
Filed Aug. 11, 1965
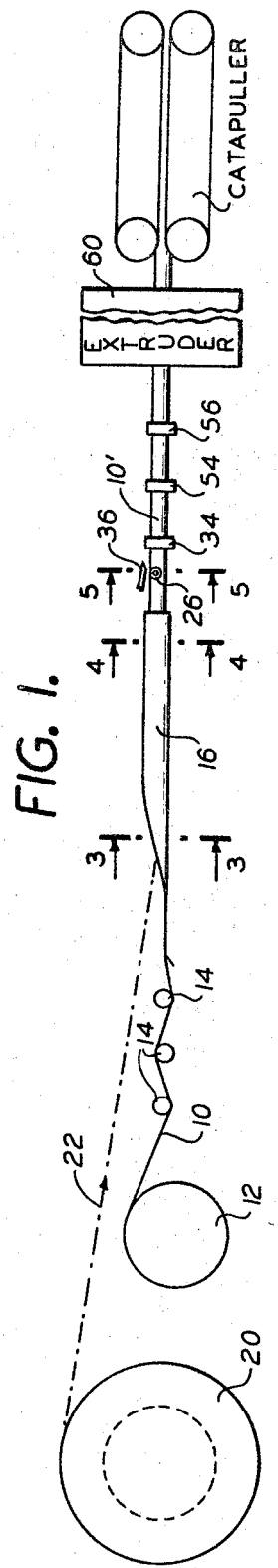
FIG. 1.
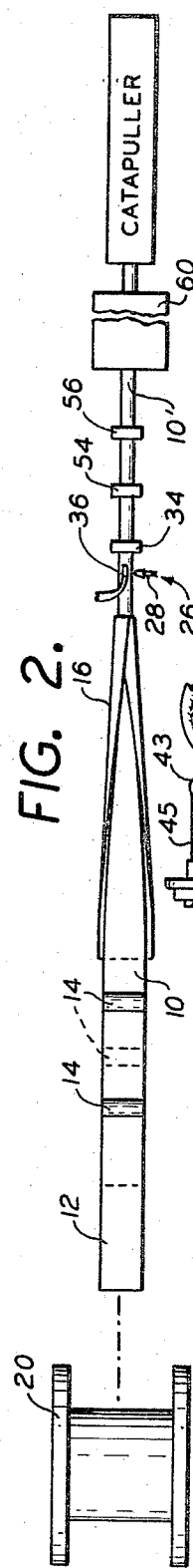
FIG. 2.
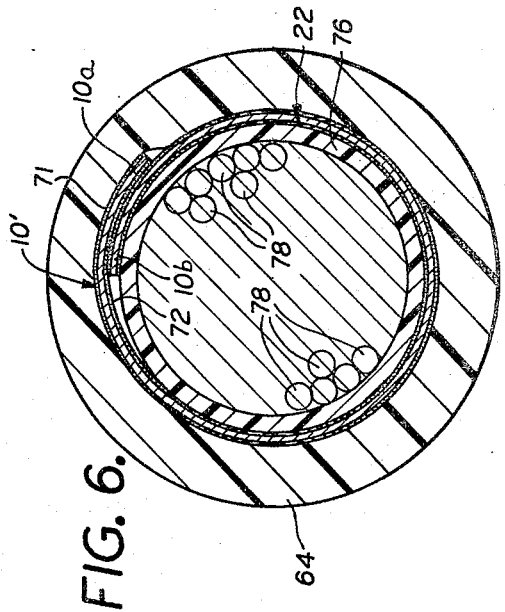
FIG. 6.
FIG. 5.
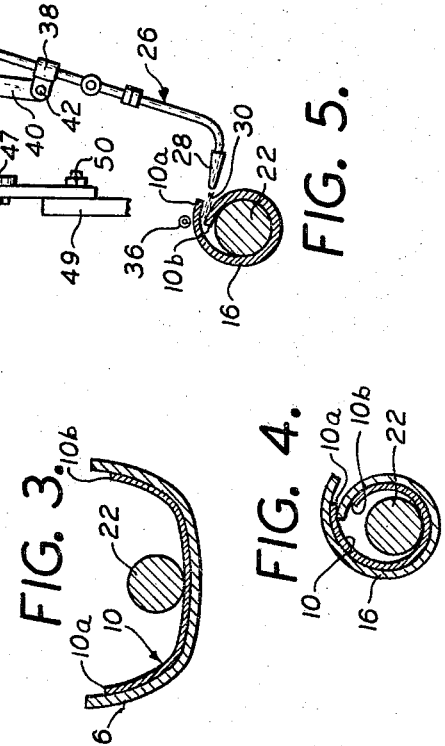
FIG. 3.
FIG. 4.
INVENTOR
OSCAR G. GARNER
BY
Sandoe, Naill, Schottler & Wikstrom
ATTORNEYS.

3,332,138
METHOD AND APPARATUS FOR MAKING PRECISION SIZED TUBING
Oscar G. Garner, Westfield, N.J., assignor to General Cable Corporation, New York, N.Y., a corporation of New Jersey
Filed Aug. 11, 1965, Ser. No. 478,791
8 Claims. (Cl. 29—430)

ABSTRACT OF THE DISCLOSURE

Method and apparatus for making precision sized tubing from a metal shielding strip coated on at least one side with an adhesive plastic, which method involves forming the coated metal strip into a longitudinally seamed tube with a lapped seam, heating the plastic to its softening point within the lap of the seam to bond the lapped edges of the tube together, drawing the tube through a die to give the tube a desired outside dimension, and then extruding a seamless plastic jacket over the outside of the formed tube.

---

This invention relates to methods and apparatus for making electrical cable which has shielding tape with one or both sides of the tape coated with a plastic layer that is chemically bonded to the shielding layer. The invention also relates to the making of the tube which comprises the shield for the electrical cable.

It is an object of this invention to provide an improved method of making shielded cable of the character indicated, and also to provide improved apparatus for making the shielded cable. More specifically, it is an object of the invention to obtain more accurate control of the dimensions of the tube that is formed of coated metal tape and which is used as the shield for a cable; and to maintain the dimensions of the tube during and after the extrusion of a plastic electrical insulating jacket over the shielding tube. Accurate control of dimensions have not been obtained with methods used in the prior art for making shielded cables.

This invention includes the technique of forming, sizing and sealing of a tube made of shielding tape coated with an adhesive polyethylene on one or both sides. Accurate dimensional control is maintained while the tube is formed and sealed prior to the application of the outside protective jacket. In this development the plastic protected tape, be it aluminum, cooper or steel, is folded into a tube, either over a core or without a core and the diameter is established by means of a guide ring or die prior to which heat is applied such as by means of a gas torch after final pre-set dimension and sealed before it enters the extruder. It was found that once the tubing dimension is pre-set by this method, the subsequent application of the outer jacket, consisting of polyethylene for example, does not change the pre-set and predetermined dimension of the tubing. It was found that if this seal prior to the jacket extrusion is only partially completed, the sealing of the tubing is completed and firm bonding perfected by means of the hot jacket extrusion.

All of this is achieved without change in the pre-set dimension of the tubing which normally would occur as the result of shrinkage of the jacket. The constant diameter of the pre-set results in a continuous and uniform bond between the tube and the jacket applied over it along the entire length of the cable.

Other objects, features and advantages of the invention will appear or be pointed out as the specification proceeds.

In the drawing, forming a part hereof, in which like reference characters indicate corresponding parts in all the views;

FIGURE 1 is a diagrammatic side elevation showing apparatus for making tubing in accordance with the method of this invention;

FIGURE 2 is a top plan view of the apparatus illustrated diagrammatically in FIGURE 1;

FIGURES 3 and 4 are greatly enlarged views taken on the section lines 3—3 and 4—4 of FIGURE 1;

FIGURE 5 is a greatly enlarged sectional view taken on the line 5—5 of FIGURE 1 and also showing diagrammatically a heating means for softening plastic coating on the metal tape of which the tubing is formed; and FIGURE 6 is a greatly enlarged sectional view showing the final shielded cable obtained by the method of this invention.

A coated metal tape 10 is supplied from a reel 12. This coated metal tape 10 may be made of aluminum, copper, steel or other metal and it is coated on one or both sides by a plastic which is chemically bonded to the metal. The expression "chemically bonded" as used herein means that there is an actual molecular interlocking of the coating to the metal. Polyethylene copolymers are used for this purpose and are well-known. The coated tape and the method of making it form no part of the present invention. This invention is a new method of using such tapes in the manufacture of shielded electric cables; and this invention also provides improved apparatus for making shielded electric cables. The coating on the tap need not be a polyethylene copolymer but can be an equivalent adhesive plastic.

The coated metal tape 10 travels over guide rollers 14 to a former 16 in which the tape 10 is bent to a generally circular contour but with edge portions 10a and 10b (FIGURES 3–5) overlapping one another to provide a longitudinal lap seam for the tube which is formed from the coated metal tape 10. The formed tube is indicated by the reference character 10', after the seam has been closed and the tube is complete.

Although the tube can be formed without any core, and electric cables can be placed in it subsequently, in the preferred method a cable core is unwound from a supply reel 20 and the cable core 22 is fed into the former 16 above the coated metal tape 10 and in position such that the tape 10 is folded around the cable core 22 in the manner illustrated in FIGURES 3–5. The width of the tape 10 can be selected, with respect to the circumference of the core 22, so that with the overlap of the edges 10a and 10b, the formed tube will fit snugly around the cable core 22.

There are advantages, however, in making the tape somewhat wider so that there is some clearance between the overlapped seam and the core at the time of heating to limit the amount of heat which reaches the insulation on the core. When the tube is made with this clearance, it is subsequently reduced in diameter in the sizing step so as to make it fit snugly around the core.

FIGURE 5 shows the heating step. The seam edge 10a is spaced slightly from the edge 10b; and there is a torch 26 with a tip 28 in position to direct a gas flame into the space between the edges 10a and 10b. The hot gases flow across the confronting faces of the overlap seam edges to heat them, and the edges are then brought together to complete the forming of the tube.

The torch 26 shown in the drawing is the type of torch known as a "jeweler's torch" and it is usually supplied with a mixture of oxygen and natural gas to produce a small and intensely hot flame 30.

The flame 30 acting on the continuously moving strip material 16 softens the coating progressively for a short width of the edge portion of the strip material. This results in a firm bond of the overlap edges of the tape or strip when the confronting faces are brought together, and avoids any roughness or puckering of the plastic coating.

In applying the flame 30 to the inside of the edge portion 10a, it is important to regulate the heat applied to the tape so as to soften only the plastic which forms the bond and to avoid, insofar as possible, the softening of the plastic on top of the edge portion 10a, where the tape is coated on both sides. If the plastic on the top of the tube is soft when the formed tape passes through a sizing die 34, the plastic will stick to the die and smear.

In order to avoid making the adjustment of the torch so critical in its heating, a nozzle 36 is located in position to blow a stream of air along the top of the formed tape to cool the plastic on the outside surface of the formed tape.

The torch 26 is movable up and down in a clamp 38 carried by a link 40 having pivot connections 42 and 43 at its opposite ends for adjusting the position of the clamp 38. These pivots 42 and 43 have high friction so that they support the clamp 38 in any position to which it is adjusted. The link 40 is connected with a shaft 45 which is connected to a bracket 47 and which is rotatable about its axis to provide further adjustment of the clamp 38 and the torch 26. This flange 47 is attached to a fixed support 49 by fastening means 50.

Referring again to FIGURES 1 and 2, the formed tape or tube 10' passes through such additional sizing dies 54 and 56 as may be necessary to obtain the desired precision sizing; and then the formed tape 10' passes through an extruder 60 in which a jacket 64 (FIGURE 6) of electrical insulating material is extruded as a seamless tube over the tube formed by the strip or tape 16. FIGURE 6 is the only figure on a large enough scale to show the coating on the strip or tape 16'. This coating includes an outer coating indicated by the reference character 71 and an inner coating indicated by the reference character 72. The edge portions 10a and 10b, bonded together as previously described, are clearly shown in FIGURE 6 but actually the thickness of the tape is greatly exaggerated in order to have a section wide enough for section lining.

The core 22 includes jacket 76 surrounding insulated conductors 78 which preferably have some form of sealant in the spaces between these individually insulated conductors 78.

The outer jacket 64 which is applied over the formed tape 16' may be made of polyethylene or polyethylene copolymer and it is extruded over the formed tape 16' at a temperature sufficient to cause the jacket to soften the outer coating 71 and to bond to this coating as the materials cool. Although there is some shrinkage of the outer jacket 64 as it cools after extrusion, the seam on the formed tape 16' is strong enough to resist breaking by shrinkage of the outer jacket, and what shrinkage occurs merely shows as a slight reduction in the radial thickness of the jacket 64. The extruder is adjusted to apply the jacket 64 with the original thickness necessary to leave the final product with the desired outside diameter after cooling and such shrinkage as occurs as the result of the cooling. The formed tape 16' can be sized even though it contains no cable core 22. The outer jacket 64 is extruded over an empty formed tape 16' in the same way as it is extruded over the formed tape surrounding a core 22. The heat of the extrusion of the jacket 64 makes the crystal structure of the coatings 71 and 72 more uniform.

The preferred embodiments of the invention have been illustrated and described, but changes and modifications can be made and some features can be used in different combinations without departing from the invention as defined in the claims.

What is claimed is:

1. The method of making a tube having a metal shielding layer of strip material that is coated on at least one side by an adhesive plastic that softens when subjected to heat of a temperature above a softening temperature of the plastic, which method comprises forming the coated metal strip into a longitudinally seamed tube with a lap seam, heating the plastic to its softening point within the lap of the seam to bond the lapped edges of the tube together, after bonding, drawing the tube through a die to give the tube a desired outside dimension, and then extruding a seamless plastic jacket over the outside of the coated metal tube with the extruded tube fitting snugly over the metal tube.

2. The method described in claim 1 characterized by forming the tube progressively over a preformed electric cable core and with the inside diameter of the tube somewhat larger than the outside diameter of the cable core, the tube being subsequently reduced in diameter to a snug fit on the cable core in the sizing step.

3. The method described in claim 2 characterized by the core and tube being correlated, during heating of the edge portions of the seam, so that there is clearance between the seam and the cable core to protect insulation on the cable core from the heat applied to the seam, and thereafter reducing the diameter of the tube to the snug fit over the cable core.

4. The method described in claim 3 characterized by sizing the combined structure by drawing the plastic tube through a sizing die after extruding the plastic tube over the coated metal tube.

5. The method described in claim 2 characterized by subsequently extruding a hot seamless plastic tube over the coated metal tube with the plastic tube a snug fit on the coated metal tube so that upon cooling and shrinking of the plastic tube the plastic tube grips the coated metal tube tightly and the plastic of the plastic tube stretches to a reduced radial thickness.

6. Apparatus for making precision sized tubing including a former through which a metal strip is pulled to bend the strip into a longitudinally seamed tube with overlapping seam edges, the metal strip having a plastic coating secured to the area on one side of the strip by chemical bonding of the metal and the plastic, heating means adjacent to one end of the former in position to heat the plastic to its softening point to bond the overlapping areas of the seam edges to one another, sizing means through which the tube is advanced to bring the tube to the desired diameter, and an extruder beyond the sizing means in position to apply a seamless plastic tube over the sized coated metal tube with a snug fit.

7. The apparatus described in claim 6 characterized by a cable core supply means that supplies a cable core progressively through the former and into the interior of the lap seam tube, the sizing means including a die that draws the coated metal tube down over the cable core with a snug fit.

8. The apparatus described in claim 6 characterized by the former having an end portion that leaves the overlapping edge portions of the tube slightly spaced from one another so that the seam is open, heating means for projecting heat across the confronting faces of the tube and for softening the plastic on a tube that has both sides of the metal coated with plastic and bonded thereto by a chemical bond, the sizing means including a die that brings the edges of the tube together and that draws the tube down to a desired diameter, and the extruder including another die through which the seamless plastic tube is applied over the coated metal tube, and the extruder having means for applying the plastic in heated condition to the coated metal tube.

References Cited

UNITED STATES PATENTS

| | | | |
|---|---|---|---|
| 2,605,202 | 7/1952 | Reynolds | 29—429 |
| 3,122,114 | 2/1964 | Kringel et al. | 29—200 |
| 3,226,817 | 1/1966 | Simborg et al. | 29—430 |
| 3,230,615 | 1/1966 | Krengel et al. | 29—200 |
| 3,256,592 | 6/1966 | Krengel et al. | 29—200 |
| 3,260,636 | 7/1966 | Witzenmann | 156—203 |

JOHN F. CAMPBELL, *Primary Examiner.*

THOMAS H. EAGER, *Examiner.*